US009942884B2

(12) United States Patent
Lee et al.

(10) Patent No.: US 9,942,884 B2
(45) Date of Patent: Apr. 10, 2018

(54) EFFICIENT UPLINK DATA INDICATION TECHNIQUES FOR MIMO-OFDMA TRANSMISSION IN WLAN

(71) Applicant: Nokia Technologies Oy, Espoo (FI)

(72) Inventors: Namyoon Lee, Walnut Creek, CA (US); Sarabjot Singh, Berkeley, CA (US); Esa Tuomaala, El Cerrito, CA (US); Sayantan Choudhury, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 2 days.

(21) Appl. No.: 15/155,407

(22) Filed: May 16, 2016

(65) Prior Publication Data

US 2016/0338040 A1 Nov. 17, 2016

Related U.S. Application Data (60) Provisional application No. 62/162,027, filed on May 15, 2015.

(51) Int. Cl.
| | |
|---|---|
| *H04B 7/02* | (2018.01) |
| *H04W 72/04* | (2009.01) |
| *H04L 5/00* | (2006.01) |
| *H04B 7/0456* | (2017.01) |
| *H04W 8/26* | (2009.01) |

(52) U.S. Cl.
CPC ...... *H04W 72/0413* (2013.01); *H04B 7/0456* (2013.01); *H04L 5/0007* (2013.01); *H04W 8/26* (2013.01)

(58) Field of Classification Search
CPC .. H04W 72/0413; H04W 8/26; H04L 5/0007; H04B 7/0456
USPC .................................................. 375/260, 267
See application file for complete search history.

(56) References Cited

U.S. PATENT DOCUMENTS

| | | | | |
|---|---|---|---|---|
| 8,489,403 | B1* | 7/2013 | Griffin | G10L 19/008 375/260 |
| 9,143,215 | B2* | 9/2015 | Ebrahimi Tazeh Mahalleh | H04B 7/0613 |
| 9,516,513 | B2* | 12/2016 | Sægrov et al. | H01Q 3/2605 |
| 2016/0211867 | A1* | 7/2016 | Guillemette | H03M 13/1114 |

OTHER PUBLICATIONS

Candès, E.J. et al.; "Robust Uncertainty Principles: Exact Signal Reconstruction From Highly Incomplete Frequency Information"; IEEE Transactions on Information Theory, vol. 52, No. 2; Feb. 2006; whole document (21 pages).
Ohlsson, H. et al.; "Quadratic Basis Pursuit"; Feb. 9, 2013; whole document (9 pages).

* cited by examiner

*Primary Examiner* — Chieh M Fan
*Assistant Examiner* — Fitwi Hailegiorgis
(74) *Attorney, Agent, or Firm* — Harrington & Smith (57) ABSTRACT

Uplink data indication transmission(s) are received over a subband and over OFDM symbol(s) from STA(s) in a wireless communication system. The received uplink data indication transmission(s) are decoded to determine a unique codeword for each of the STA(s). From the determined unique codewords and using a mapping between station IDs and codewords in a codebook, a unique station ID is determined for each of the STA(s). For STA(s) determined to have sent the uplink data indication, other operations are performed to prepare for subsequent reception of uplink data from the STA(s) determined to have sent the uplink data indication.

17 Claims, 9 Drawing Sheets

EFFICIENT UPLINK DATA INDICATION TECHNIQUES FOR MIMO-OFDMA TRANSMISSION IN WLAN

CROSS-REFERENCE TO RELATED APPLICATIONS

The present application claims the benefit under 35 U.S.C. § 119(e) of U.S. Provisional Patent Application No. 62/162,027, filed on May 15, 2015, the disclosure of which is hereby incorporated by reference in its entirety.

TECHNICAL FIELD

This invention relates generally to wireless communications and, more specifically, relates to uplink communications in wireless local area networks (WLANs).

BACKGROUND

Recently, in order to improve the throughput for the next generation WiFi systems, orthogonal frequency division multiplexing access (OFDMA) has been actively discussed as a key feature by the standardization body (e.g., IEEE 802.11 ax). The major virtues of OFDMA are 1) the possibility of reducing the channel contention time by fine frequency domain resource utilization and 2) the possibility of exploiting frequency and multiuser diversity via frequency selective scheduling.

BRIEF SUMMARY

This section is intended to include examples and is not intended to be limiting.

In an exemplary embodiment, a method is disclosed that includes receiving at least one uplink data indication transmission over a subband and over one or more orthogonal frequency division multiplexing symbols from at least one station in a wireless local area network communication system and decoding the received at least one uplink data indication transmission to determine a unique codeword for each of the at least one stations. The method also includes determining, from the determined unique codewords and using a mapping between station identification and codewords in a codebook, a unique station identification for each of the at least one stations. The method further includes performing, for the at least one station determined to have sent the uplink data indication, other operations to prepare for subsequent reception of uplink data from the at least one station determined to have sent the uplink data indication.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving at least one uplink data indication transmission over a subband and over one or more orthogonal frequency division multiplexing symbols from at least one station in a wireless local area network communication system; decoding the received at least one uplink data indication transmission to determine a unique codeword for each of the at least one stations; determining, from the determined unique codewords and using a mapping between station identification and codewords in a codebook, a unique station identification for each of the at least one stations; and performing, for the at least one station determined to have sent the uplink data indication, other operations to prepare for subsequent reception of uplink data from the at least one station determined to have sent the uplink data indication.

An exemplary computer program product includes a computer-readable storage medium bearing computer program code embodied therein for use with a computer. The computer program code includes: code for receiving at least one uplink data indication transmission over a subband and over one or more orthogonal frequency division multiplexing symbols from at least one station in a wireless local area network communication system; code for decoding the received at least one uplink data indication transmission to determine a unique codeword for each of the at least one stations; code for determining, from the determined unique codewords and using a mapping between station identification and codewords in a codebook, a unique station identification for each of the at least one stations; and code for performing, for the at least one station determined to have sent the uplink data indication, other operations to prepare for subsequent reception of uplink data from the at least one station determined to have sent the uplink data indication.

In a further exemplary embodiment, an apparatus comprises: means for receiving at least one uplink data indication transmission over a subband and over one or more orthogonal frequency division multiplexing symbols from at least one station in a wireless local area network communication system; means for decoding the received at least one uplink data indication transmission to determine a unique codeword for each of the at least one stations; means for determining, from the determined unique codewords and using a mapping between station identification and codewords in a codebook, a unique station identification for each of the at least one stations; and means for performing, for the at least one station determined to have sent the uplink data indication, other operations to prepare for subsequent reception of uplink data from the at least one station determined to have sent the uplink data indication.

In another exemplary embodiment, a method is disclosed that includes, in a station in a wireless local area network communication system, determining a unique codeword from a codebook based on a unique station identification for the station and a mapping between station identification and codewords in the codebook. The method further includes performing, using the unique codeword, at least one uplink data indication transmission over a subband and over one or more orthogonal frequency division multiplexing symbols from the station. The method also includes transmitting, after performing the at least one uplink data indication transmission, uplink data from the station in an uplink transmission.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: in a station in a wireless local area network communication system, determining a unique codeword from a codebook based on a unique station identification for the station and a mapping between station identification and codewords in the codebook; performing, using the unique codeword, at least one uplink data indication transmission over a subband and over one or more orthogonal frequency division multiplexing symbols from the station; and transmitting, after performing the at least one uplink data indication transmission, uplink data from the station in an uplink transmission.

An exemplary computer program product includes a computer-readable storage medium bearing computer program code embodied therein for use with a computer. The computer program code includes: code, in a station in a wireless local area network communication system, for determining a unique codeword from a codebook based on a unique station identification for the station and a mapping between station identification and codewords in the codebook; code for performing, using the unique codeword, at least one uplink data indication transmission over a subband and over one or more orthogonal frequency division multiplexing symbols from the station; and code for transmitting, after performing the at least one uplink data indication transmission, uplink data from the station in an uplink transmission.

A further exemplary embodiment is an apparatus comprising: means, in a station in a wireless local area network communication system, for determining a unique codeword from a codebook based on a unique station identification for the station and a mapping between station identification and codewords in the codebook; means for performing, using the unique codeword, at least one uplink data indication transmission over a subband and over one or more orthogonal frequency division multiplexing symbols from the station; and means for transmitting, after performing the at least one uplink data indication transmission, uplink data from the station in an uplink transmission.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIGS. 3A and 3B are collectively referred to as FIG. 3.

FIGS. 4A and 4B are collectively referred to as FIG. 4.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
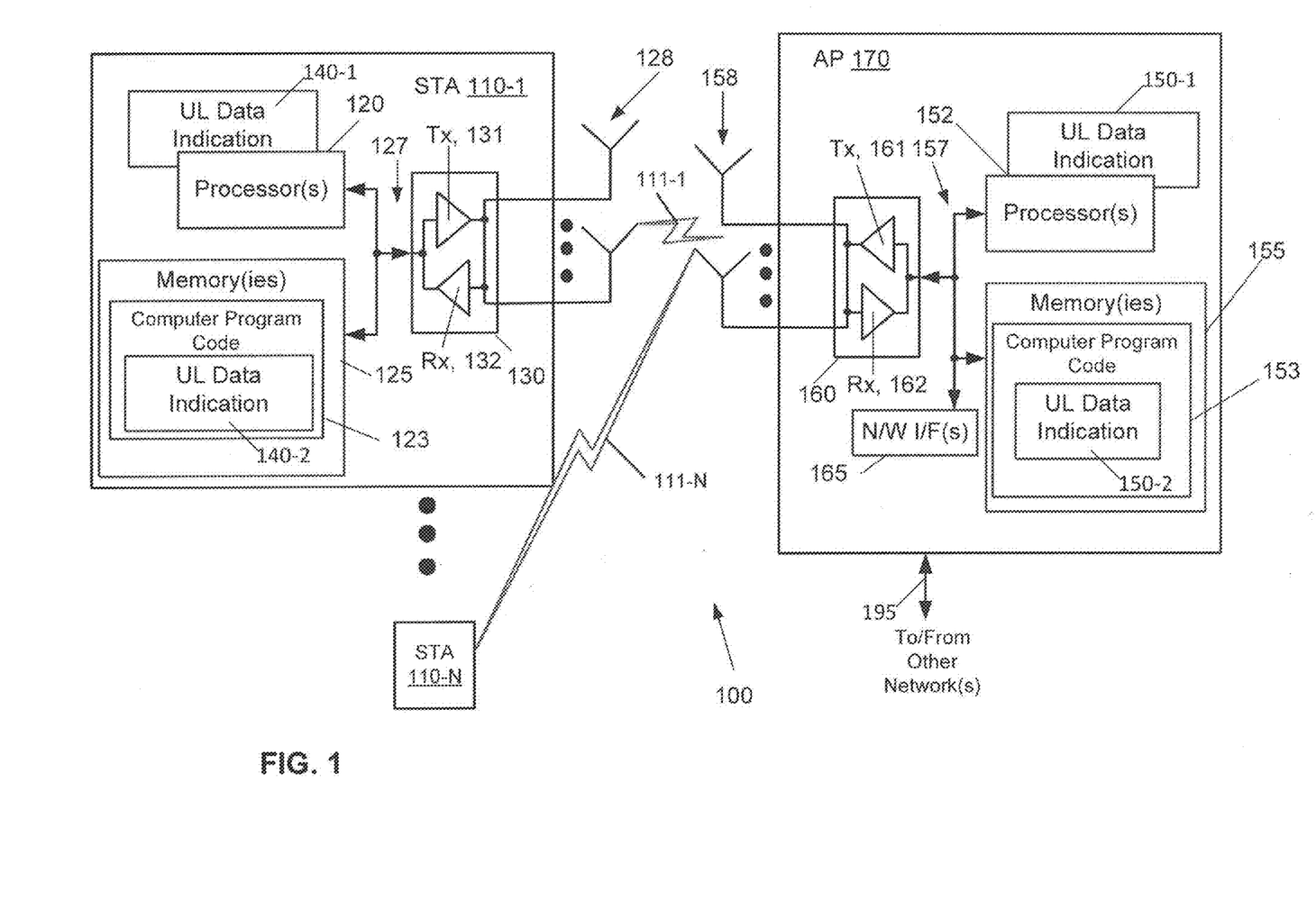
FIG. 1 is a block diagram of an exemplary system in which the exemplary embodiments may be practiced.

Turning to FIG. 1, this figure shows a block diagram of an exemplary system in which the exemplary embodiments may be practiced. In FIG. 1, N STAs 110 are in wireless communication with an AP 170 as part of a wireless network 100. One STA 110-1 will be described, and it is assumed that the other STAs (110-2 through 110-N) are similar.

The STA 110-1 includes one or more processors 120, one or more memories 125, and one or more transceivers (e.g., modems) 130 interconnected through one or more buses 127. Each of the one or more transceivers 130 includes a receiver, Rx, 132 and a transmitter, Tx, 131. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The STA 110-1 includes an UL data indication module 140, comprising one of or both parts 140-1 and/or 140-2, which may be implemented in a number of ways. The UL data indication module 140 may be implemented in hardware as UL data indication module 140-1, such as being implemented as part of the one or more processors 120. The UL data indication module 140-1 may be implemented also as an integrated circuit or through other hardware such as a programmable gate array. In another example, the UL data indication module 140 may be implemented as UL data indication module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. Each STA 110 communicates with AP 170 via a corresponding wireless link 111, such that there are N wireless links 111.

The AP 170 is a network node that provides access by wireless devices such as the STAs 110 to the wireless network 100. The AP 170 includes one or more processors 152, one or more memories 155, one or more network interfaces (N/W I/F(s)) 165, and one or more transceivers 160 interconnected through one or more buses 157. Each of the one or more transceivers 160 includes a receiver, Rx, 162 and a transmitter, Tx, 161. The one or more transceivers 160 are connected to one or more antennas 158. The one or more memories 155 include computer program code 153. The AP 170 includes an UL data indication module 150, comprising one of or both parts 150-1 and/or 150-2, which may be implemented in a number of ways. The UL data indication module 150 may be implemented in hardware as UL data indication module 150-1, such as being implemented as part of the one or more processors 152. The UL data indication module 150-1 may be implemented also as an integrated circuit or through other hardware such as a programmable gate array. In another example, the UL data indication module 150 may be implemented as UL data indication module 150-2, which is implemented as computer program code 153 and is executed by the one or more processors 152. For instance, the one or more memories 155 and the computer program code 153 are configured to, with the one or more processors 152, cause the AP 170 to perform one or more of the operations as described herein. The one or more network interfaces 165 communicate over one or more further network(s), e.g., via the link(s) 195. The one or more buses 157 may be address, data, or control buses, and may include any interconnection mechanism, such as a series of lines on a motherboard or integrated circuit, fiber optics or other optical communication equipment, wireless channels, and the like.

The computer readable memories 125 and 155 may be of any type suitable to the local technical environment and may be implemented using any suitable data storage technology, such as semiconductor based memory devices, flash memory, magnetic memory devices and systems, optical memory devices and systems, fixed memory and removable memory. The processors 120 and 152 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the STA 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

For the multiuser uplink OFDMA transmissions in WLAN systems, the AP may not have the knowledge about the existence of uplink traffic across different associated STAs. In examples of this invention, we propose, e.g., new uplink data traffic detection techniques to address this issue, where exemplary techniques are based on non-orthogonal codes by, e.g., exploiting a sparse signal recovery algorithm in compressive sensing theory. This can reduce the signaling overhead significantly compared to other techniques.

Introductory examples of the invention may include one or more of the following.

1) In an example, we propose a method of mapping STA's ID (e.g., AID) (e.g., during AID assignment, re-assignment, and the like) to the transmission sequence (e.g., codeword) and subband index for uplink data indication.

For this example, a subset of the bits in AID may be mapped to subband index so that uplink OFDMA STAs are uniformly spread over each subband, which leads to reduced collision probability for the uplink data indication transmission period and improves the auto-correlation property.

Additionally, the remaining partial bits in the AID may be mapped to a codeword in the codebook (e.g., a collection of transmission sequences).

2) In another example, we propose a method of mapping AID to indicate a MIMO mode (such as beamforming or spatial multiplexing) or/and traffic types (e.g., access category) of the uplink transmission by superposing codewords. Access category, in an exemplary embodiment, refers to levels of priority in EDCA access. In the 802.11 standard, it is defined as the following. Access category (AC): A label for the common set of enhanced distributed channel access (EDCA) parameters that are used by a quality-of-service (QoS) station (STA) to contend for the channel in order to transmit medium access control (MAC) service data units (MSDUs) with certain priorities. Meanwhile, the term traffic type refers to the different types of traffic categories which are differentiated using different parameters and requirements providing a different level of service to end users, e.g., voice, video, data, and the like.

3) For a further example, we propose a method of transmitting non-orthogonal codewords during the uplink data indication period.

For this example, we propose to construct non-orthogonal codebooks for uplink data indication transmissions by selecting partial rows of any orthogonal matrices, for instance, a DFT matrix and a Hadamard matrix.

4) For wideband operations in another illustration, we propose a method of duplicating the uplink indication frame transmission on one or more secondary channels if the STA wants to send data using multiple channels.

Figure 2:
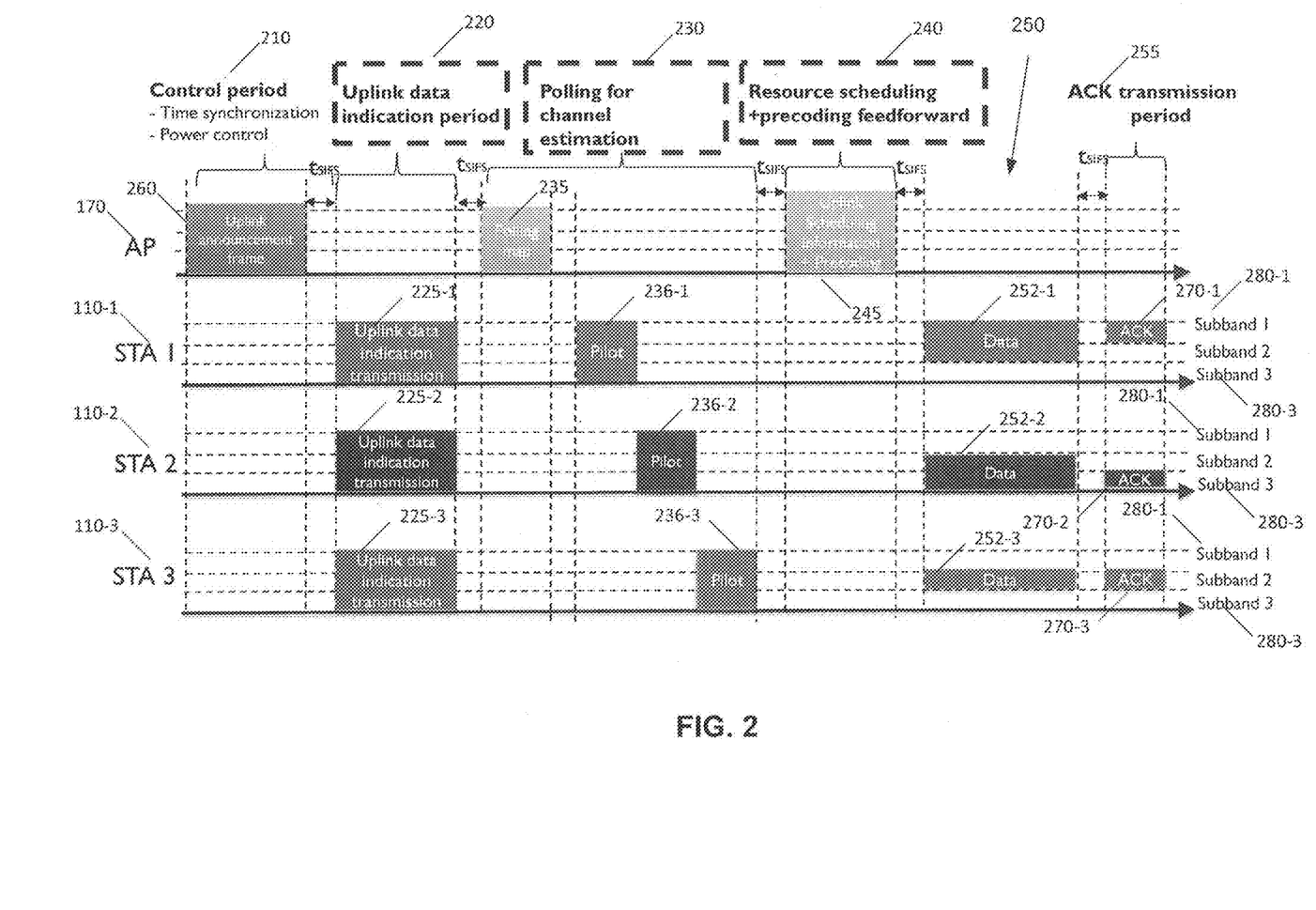
FIG. 2 is an example of a proposed uplink MIMO-OFDMA transmission protocol.

Now that an introduction has been provided, more detailed examples are described. Turning to FIG. 2, this figure illustrates an example of a proposed uplink OFDMA transmission protocol. FIG. 2 illustrates a control period 210, an uplink data indication period 220, a polling period 230 for channel estimation, a period 240 for resource scheduling and precoding feedforward, a period 250 for data transmissions 252 by the STAs 110 using subbands 280-1, 280-2, and 280-3, and an ACK transmission period 255. The $t_{SIFS}$ is a period for short interframe spaces. The polling period 230 for channel estimation includes the AP 170 sending a polling map 235 and receiving in response pilots 236-1, 236-2, and 236-3 from the STAs 110-1, 110-2, and 110-3, respectively. The period 240 for resource scheduling and precoding feedforward includes the AP 170 sending uplink scheduling information and precoding 245 to the STAs 110. In the period 250, the STA 110-1 transmits data transmission 252-1 using subbands 280-1 and 280-2, the STA 110-2 transmits data transmission 252-2 using subbands 280-2 and 280-3, and the STA 110-3 transmits data transmission 252-3 using subband 280-2. The AP 170 transmits ACK information 270-1, 270-2, and 270-3 in subbands 280-1, 280-3, and 280-2 to STAs 110-1, 110-2, and 110-3, respectively.

As illustrated in FIG. 2, an AP initiates the uplink MIMO-OFDMA transmission once the AP grabs the channel based on conventional DCF or EDCA procedures. To initiate the uplink communication, the AP broadcasts an uplink announcement frame 260 (e.g., sounding frame) to the STAs 110-1 through 110-3 in a control period 210 (which allows for, e.g., time synchronization and power control). The announcement frame 260 may contain legacy preambles (e.g., L-STF and L-LTF) and signal fields (SIG-A) for 802.11 ax devices. Upon hearing this, legacy STAs 110 (e.g., implementing IEEE 802.11 a/b/n/ac) can set NAVs for the duration of uplink data indication transmission for 802.11ax.

After the uplink announcement frame 260, the STAs 110 that are associated with the AP 170 can operate synchronously and control the transmit power being used for uplink communication in order to prevent near-far effects. Once the 802.11 ax STAs receive the sounding frame, those 802.11 ax STAs who have uplink data (in this example, STAs 1, 2, and 3) prepare the uplink data indication transmission period 220 that follows the announcement frame 210. Note that other STAs (not shown) which do not have uplink data could receive the uplink announcement frame 260 but not respond via a corresponding uplink data indication transmission 225 (as the STAs do not have data to send). The AP 170 may duplicate this announcement frame 260 over one or more secondary channels based on the availability. This would also indicate to the STAs if they need to indicate wider channel operation or not in the next phase.

Regarding uplink data indication transmissions 225, in an exemplary embodiment, the codeword transmission per STA is over a subband not multiple subbands. This subband index is, e.g., predefined based on partial bits of the AID per STA. So, although FIG. 2 appears to describe codeword transmissions that look like wideband in uplink data indication period 220, each STA 110 sends the codeword per subband 280. Further for uplink data indication transmissions 225, denote the number of subbands and the number of OFDM symbols used in the uplink data indication transmission period 220 as F and U respectively. For example, the number of subbands for 256 FFT size would be F=8 and the number of OFDM symbols allocated to the uplink data indication can be U=3. We will explain the idea of an exemplary proposed uplink data indication method using F=8 and U=3, but these values can be selected differently depending on system performance requirements.

In the period 220 of the uplink data indication transmission, the active STAs (e.g., 802.11 ax STAs who have data to send) send one or more codewords, i.e., sequences of signals using a subband over a few OFDM symbols. The transmitted codeword per uplink user is mapped to the STA ID (e.g., AID). Assuming that AID consists of L bits, the last (or the first) $\log_2(F)=3$ bits among L bits may be used to indicate the subband information for the uplink data indication. In particular, when the AP 170 assigns an AID for each STA, the AP may assign the same partial bits of AID (e.g., 3 bits) to an OFDMA group. For example, if the AP 170 is associated with a set of 24 STAs, then the AP 170 may uniformly divide the entire set of STAs into $2^3=8$ OFDMA groups and assign the same three bits of AID per group. Using the remaining "L–$\log_2(F)$" bits, we can construct a total of $2^{L-\log_2(F)}$ of codewords (e.g., the cardinality of the codeword set). The length of bits "L" used for codeword mapping can be updated periodically by the AP 170 and may be sent to the associated STAs 110 using, e.g., beacon signals.

For a given number of codewords, one possible codebook construction method is the use of a sub-matrix of $M \times 2^{L-\log_2(F)}$ discrete time Fourier matrix, where each column of the matrix corresponds to a codeword (e.g., a sequence of transmit signals). Here, M denotes the dimension of the codeword vector (e.g., the length of transmit signals) and is determined by the product of the number of subcarriers per subband and the number of OFDM symbols allocated to the uplink data indication period. This value may be typically chosen such that M=(number of subcarriers per subband)×(number of OFDM symbol)<<$2^{L-\log_2(F)}$. Therefore, the codewords may not be all mutually orthogonal unlike Walsh or ZC codewords used in CDMA. For instance, when we use the L as the 12 least significant bits of AIDs to create a codebook, i.e., L=12, the number of codewords is $2^9=512$. Considering the 256 FFT size and F=8 subchannels, we have a total of 26 data subcarriers per one subchannel. Therefore, when we allocate the three OFDM symbols for the uplink data indication, i.e., U=3, the dimension of the codeword can be determined as M=26×3=78. The smaller number of OFDM symbols (U) implies the smaller signal dimension for the codeword representation (e.g., the smaller length of transmit signals), which would increase the MAC efficiency by reducing signaling overheads that are required for the uplink data indication transmission. As a result, as shown in FIG. 3, the uplink data indication frame for uplink data indication period 220 (see FIG. 3B) comprises a few OFDM symbol durations (e.g., three OFDM symbols 350-1, 350-2, and 350-3) and a STA 110 only delivers the sequence of signals (e.g., a codeword 310) excluding SIG-fields for control information.

Figure 3:
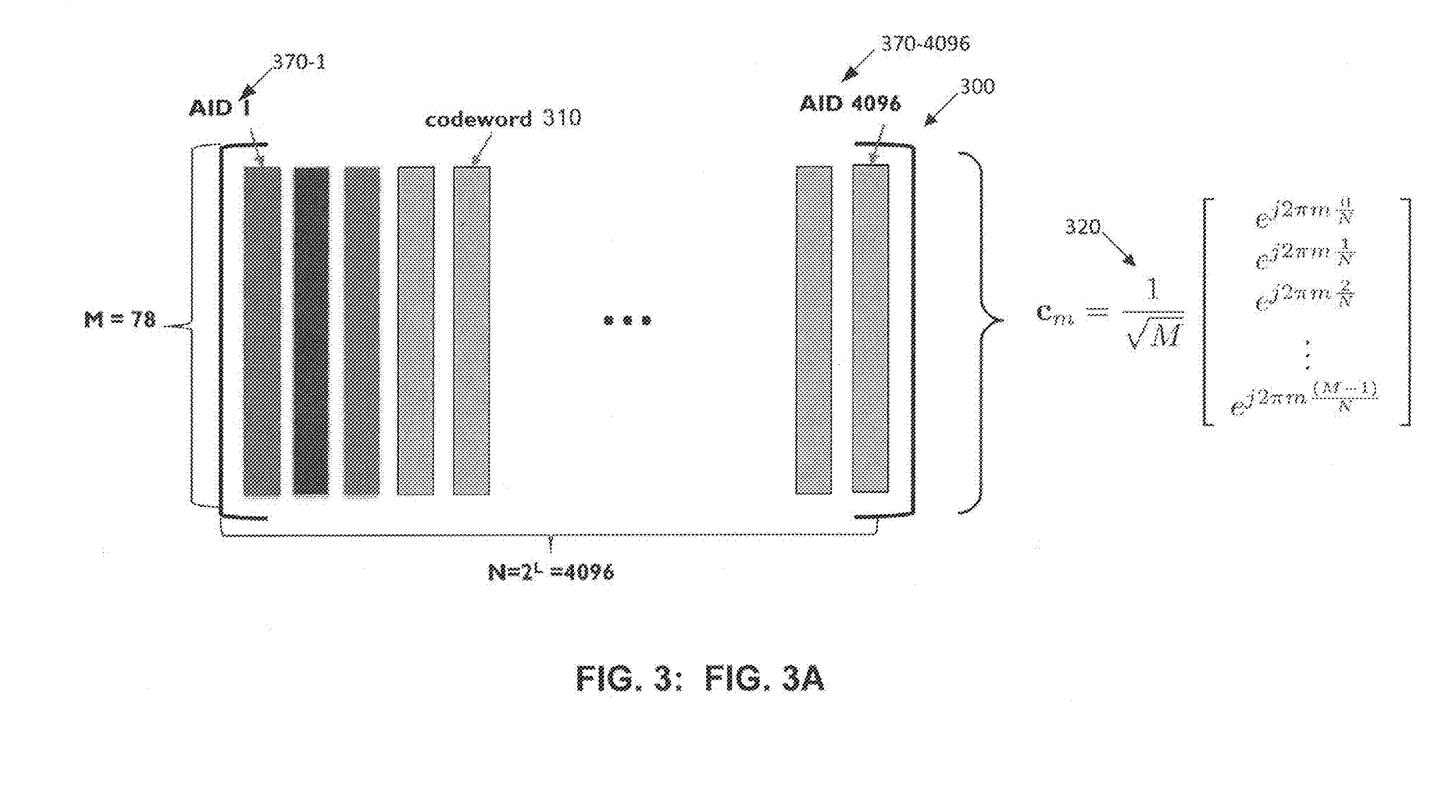
FIG. 3A is a codebook construction example for the uplink data indication period.
FIG. 3B is an illustration of transmission of different codewords for uplink data indication transmission using the three OFDM symbols of the first subband.

More particularly, FIGS. 3A and 3B are collectively referred to as FIG. 3. FIG. 3A is a codebook construction example for the uplink data indication period. FIG. 3B is an illustration of transmission of different codeword vectors for uplink data indication transmission using the three OFDM symbols of the first subband. In this example, three users who have the same subband index 345 (e.g., the same OFDMA group), which in this example are the three MSBs, in AID and send different codewords 310 for uplink data indication transmission using the three OFDM symbols 350 of the first subband. The symbol durations are 16 μsec long and are proceeded by a cyclic prefix (CP). The codebook construction in this example is based on a partial DFT matrix 300, which corresponds and maps to 512 AID vectors 370-1 through 370-512. The partial DFT matrix has 512 codewords 310 determined using the formula 320 for the m-th codewords. Each codeword is in vector format and is a column of the matrix 300. In this example, $N=2^{L-\log_2(F)}=2^9=512$. The STA IDs 330-1, 330-2, and 330-3 are also shown and these correspond and map to the codewords 310-1, 310-2, and 310-3.

Another possible codebook construction is to take M ($<<2^{L-\log_2(F)}$) rows of any other orthogonal matrices (e.g., Hadamard matrix) with size of $2^{L-\log_2(F)} \times 2^{L-\log_2(F)}$. Furthermore, it is also possible to construct the codebook by selecting the elements of a codeword from a Gaussian distribution.

Recall that the codewords assigned to the STAs 110 are not mutually orthogonal, which is one difference between examples herein and with CDMA based transmission techniques. Nevertheless, the cross correlation between any codewords (even though in a randomly generated codebook) is low enough by the law of large numbers, as the numbers of M (=78) is large enough. By sharing the codebook construction method a priori between the AP and STAs, all the active STAs select a codeword (e.g., a sequence of signals) in the codebook (e.g., represented by matrix 300 in FIG. 3A) for uplink data indication transmission as shown in FIG. 2. For example, when M=78, the codeword is transmitted over the entire resource of three OFDM symbols 350 (assuming 256 FFT and 8 subchannels) during the uplink data indication period 220.

We also propose, in an exemplary embodiment, to harness orthogonal codewords by increasing the size of M to the same number of N. For example, to construct an orthogonal codebook, i.e., N=M, we may use an N by N DFT matrix whose columns represent codewords. Another example of using orthogonal codewords is to use an identity matrix. The use of the identity matrix is equivalent to allocating one AID to a particular subcarrier-time resource. It is also possible to use ZC sequences to construct orthogonal codewords for an uplink data indication transmission period by increasing the number of resources.

Figure 4:
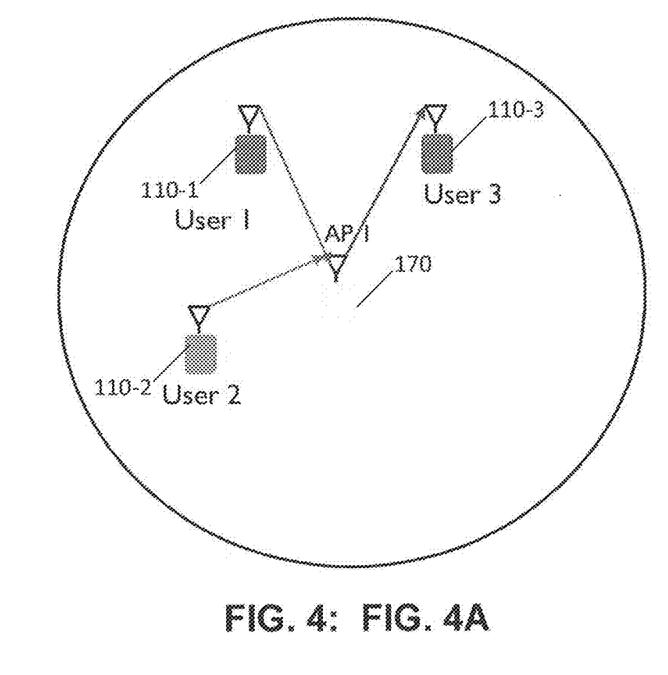
FIG. 4A is an example of a system and FIG. 4B is an example of a codebook construction in an exemplary embodiment.

As illustrated in FIG. 4, we can also extend the above protocol to the case of the uplink data transmission indication for multi-stream or/and traffic type (e.g., access category), where an active STA intends to send multiple data streams depending on their traffic type (e.g., access category) in uplink. FIGS. 4A and 4B are collectively referred to as FIG. 4. FIG. 4A is an example of a system and FIG. 4B is an example of a codebook construction in an exemplary embodiment. FIG. 4 therefore illustrates a codebook construction example for the uplink data indication transmission period 220 that carries MIMO transmission mode or/and traffic type (e.g., access category) information. In this example, the AP 170 (see FIG. 4A) is in communication with three STAs (referred to as users) 110-1, 110-2, and 110-3, and each AID corresponds and maps to (see FIG. 4B) three codewords in the codebook 400. Each STA 110 sends a linear combination of the codewords 310 depending, e.g., on the MIMO transmission mode (such as beamforming or spatial multiplexing) or/and traffic type (e.g., access category) of the uplink data traffic. Examples of possible linear combinations include the following (where access categories are used as a specific example of a traffic type):

c1: SISO with access category 1;
c2: SISO with access category 2;
c3: SISO with access category 3;
c1+c2: SISO with access category 4;
c1+c3: MIMO (two streams) with access category 1;
c2+c3: MIMO (two streams) with access category 2; and
c1+c2+c3: MIMO (two streams) with access category 3.

Note that these are illustrated as example mapping rules 450, as the STAs use these rules when performing transmissions for the uplink data indication period 220 for the partial AID 1 410-1. There would be similar rules for the partial AIDs 2 410-2 and 3 410-3. Also, note that SISO could simply be assumed, so that codewords corresponding to only c1, only c2, only c3 or c1+c2 would indicate the corresponding access category only (e.g., and SISO would be assumed). As another example, the codewords could indicate only SISO/MIMO or only access category.

By allocating multiple codewords per AID, the STA that wants to send data using MIMO transmission (via, e.g., spatial multiplexing or beamforming) sends the sum of codewords during the uplink indication period 220. For example, if the STA 1's ID is mapped to the partial AID 1 410-1, which includes codeword vector 1 (c1), codeword vector 2 (c2), and codeword vector (c3), then the STA 1, 110-1 transmits c1+c3 during the uplink data indication period 220 if the STA wants to use a MIMO transmission with access category 1 in the uplink data transmission phase. Similar use for sums of codewords would be used by STAs 110 mapped to the partial AID 2 410-2, the partial AID 2 410-3, and the like.

Moreover, the STAs 110 may also duplicate their codewords in the same subband in one or more secondary channels. The AP 170, upon receiving the corresponding codewords over multiple channels, is able to estimate the availability of wider channels at the STA for uplink transmission. This information can then be used by AP in the scheduling and precoding forward phase (phase 240) of FIG. 2.

Concerning decoding for uplink data indication transmission, we now turn our attention to the decoding procedure. After removing the CP, the total received signal vector in the i-th subband at the AP during the uplink data indication period is given by the following:

$$y[i] = \sum_{k \in S} h_k[i] c_k + n[i], \quad (1)$$

where $c_k$ denotes the codeword vector sent by the kth STA; $h_k[i]$ denotes the i-th subband channel gain from the k-th STA to the AP; and the vector n[i] denotes the noise signal in the i-th subband. Furthermore, the set S denotes the collection of indexes for the active STAs using the i-th subband for uplink data indication. The equation (1) can be rewritten in the matrix form as the following:

$$y[i] = [c_1, c_2, \ldots, c_N] \begin{bmatrix} x_1 \\ x_2 \\ \vdots \\ x_N \end{bmatrix} + n[i]. \quad (2)$$

where $x_n$ is defined as $x_n = h_n[i]$ if n is in S, otherwise $x_n = 0$. For the given y[i] and $c_k$, the information-theoretically optimal coherent decoding method is maximum likelihood decoding (MLD). However, the complexity of MLD increases with the number of codewords exponentially, i.e., it is NP-hard. Fortunately, from compressive sensing theory, it is possible to detect the non-zero position of vector x reliably and efficiently, relying on the sparse signal recovery algorithm and using the fact that the number of active STAs is much less than the dimension of the codeword, M, i.e., (K/F)<<M. One practical sparse signal recovery algorithm is the use of convex relaxation techniques. Basis pursuit (BP) is described in E. J. Candes, J. Romberg, and T. Tao, "Robust uncertainty principles: exact signal reconstruction from highly incomplete frequency information," IEEE Trans. Inf. Theory, vol. 52, no. 2, pp. 489-509, February 2006. BP is a well-known convex relaxation technique to determine the position of non-zero elements in x (e.g., detecting the active AID) by solving the following problem:

$$\min \|x\|_1 \text{ subject to } \|y - Cx\|_2 \le \epsilon,$$

where $\|\bullet\|_l$ is the L−1 norm for $l \in \{1,2\}$, epsilon ($\epsilon$) is the error tolerance determined by the signal-to-noise ratio, and C comprises codeword vectors c. This problem can be solved via linear programming. It is worthwhile to note that there is a non-zero miss-detection probability that the AP detects the non-active users' ID by fault. But this probability becomes negligible when the K/F (i.e., the number of active STAs per subband) is less than the M/2 (i.e., K/F<=10 when M=78). We can also exploit other greedy sparse signal recovery algorithms such as orthogonal matching pursuit or subspace pursuit.

Figures 5, 5A:
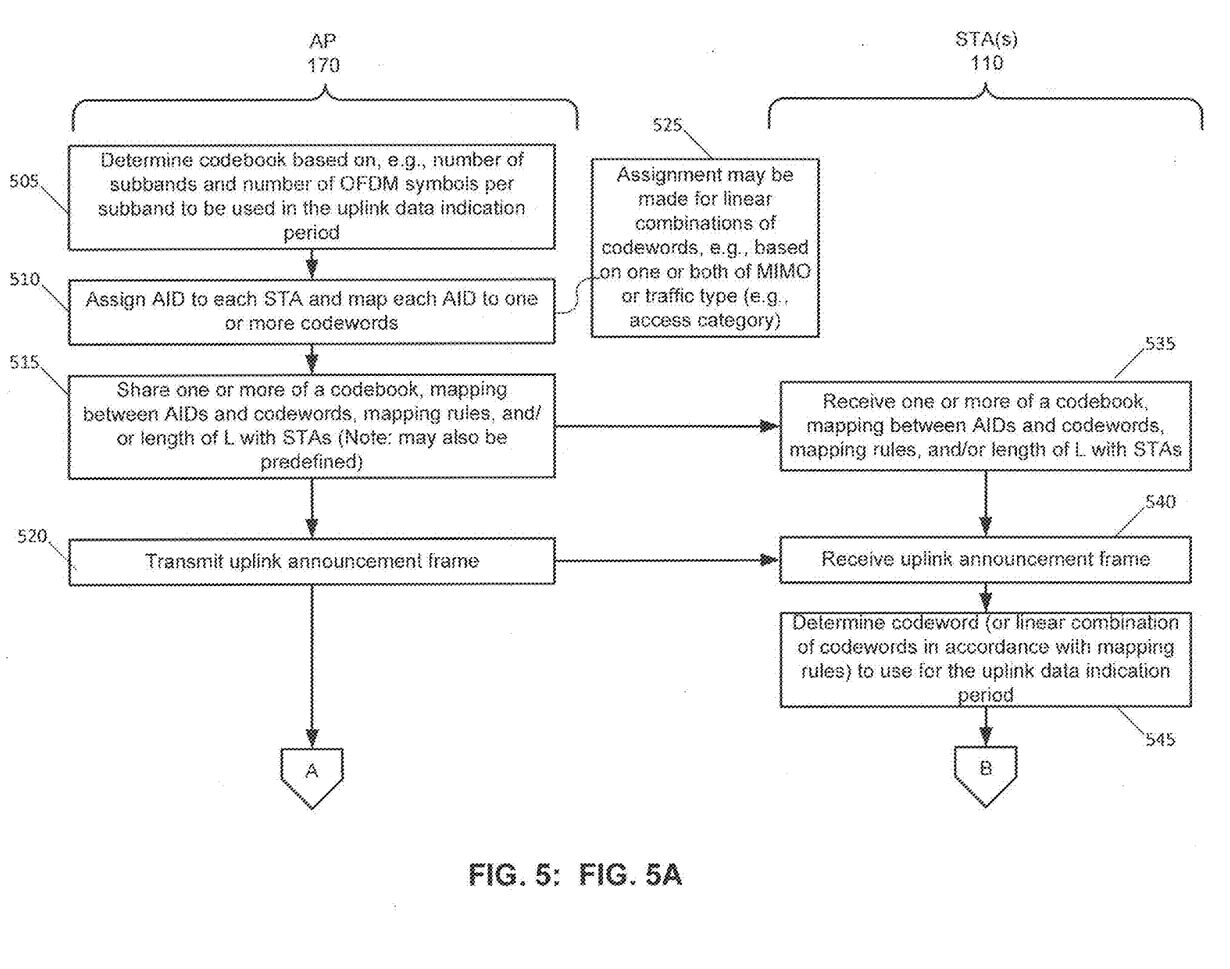
FIGS. 5A and 5B, collectively referred to as FIG. 5, are logic flow diagrams for efficient uplink data indication techniques for OFDMA transmission in WLAN, and illustrate the operation of an exemplary method, a result of execution of computer program instructions embodied on a computer readable memory, functions performed by logic implemented in hardware, and/or interconnected means for performing functions in accordance with exemplary embodiments.
Figures 5, 5B:
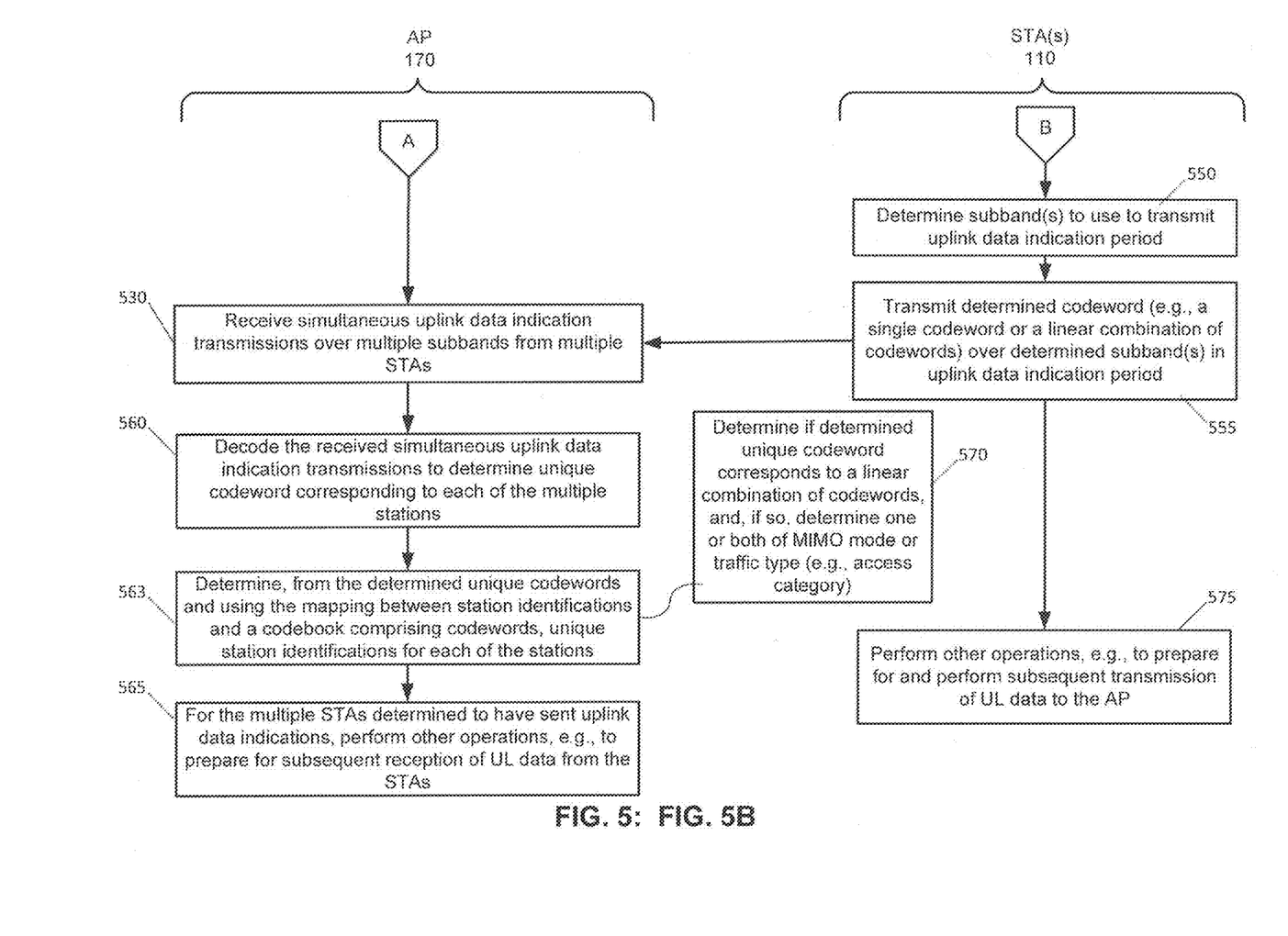

Referring now to FIGS. 5A and 5B, collectively referred to as FIG. 5, these figures are logic flow diagrams for efficient uplink data indication techniques for OFDMA transmission in WLAN. These figures illustrate the operation of an exemplary method, a result of execution of computer program instructions embodied on a computer readable memory, functions performed by logic implemented in hardware, and/or interconnected means for performing functions in accordance with exemplary embodiments.

In FIG. 5, the blocks performed by the AP 170 are illustrated on the left side of the figure, and these blocks are assumed to be performed by the AP 170, e.g., under the control in part of the UL data indication module 150. The blocks performed by a STA 110 are illustrated on the right side of the figure, and these blocks are assumed to be performed by one or more STAs 110, e.g., under the control in part of the UL data indication module 140. In the description below, one STA 110 is mainly described, but it is assumed all STAs 110 (e.g., having data to transmit) would perform similar actions.

In block 505, the AP 170 determines a codebook 300/400 based on, e.g., number of subbands 280 and number of OFDM symbols 350 to be used in the uplink data indication period 220. In block 510, the AP 170 assigns an AID to each STA and maps each AID to one or more codewords 310. As indicated by block 525, the assignment may be made for linear combinations of codewords, e.g., based on one or both of MIMO or traffic type (e.g., access category). As described in reference to FIGS. 4A and 4B, the AP 170 may (block 515) share one or more of the codebooks, mapping between AIDs and codes, mapping rules (e.g., rules 450), and/or length of L with the STAs 110. Note also that many of these (e.g., other than the length of L, which is the length of an AID) may also be predefined. For instance, only the length of L might be communicated to the STAs 110, and the other elements could be predefined via standards or in previous communications between the AP 170 and the STAs 110. Furthermore, as stated above, the codebook construction method may be shared a priori between the AP and STAs, such that all the active STAs may determine the codebook and select a codeword (e.g., a sequence of signals) in the codebook for uplink data indication transmission as shown in FIG. 2. The STAs 110 receive any transmitted information in block 535.

In block 520, the AP 170 transmits the uplink announcement frame 260, e.g., in the control period 210, and the STAs 110 receive the uplink announcement frame 260 in block 540. The STAs having to transmit data in uplink then perform the subsequent blocks 545, 550, 555, and 575. An STA 110 in block 545 determines a codeword to use for the uplink data indication period 220. The STA's AID may be used for this purpose, and the STA 110 has a mapping between STA AIDs and the codewords. Additionally, the STA 110 may determine a linear combination of codewords to use based on, e.g., mapping rules 450 and one or both of whether MIMO will be used and the traffic type (e.g., access category) in uplink to be used. The STA 110 also determines (block 550) which subband(s) to use to transmit in the uplink data indication period 220.

In block 555, the STA 110 transmits the determined codeword (e.g., a single codeword or a linear combination of codewords) over the determined subband(s) in the uplink data indication period 220. In block 530, the AP 170 receives simultaneous uplink data indication transmissions over multiple subbands from multiple STAs. In block 560, the AP 170 decodes the received simultaneous uplink data indication transmissions to determine unique codeword(s) corresponding to each of the multiple stations. Possible decoding techniques are described above. In block 563, the AP 170 determines, from the determined unique codewords and using the mapping between station identifications and a codebook comprising codewords, unique station identifications for each of the stations. If in block 570 the received codeword corresponds to a linear combination of codewords, the AP 170 uses the rules 450 to determine one or both of MIMO mode or traffic type (e.g., access category).

In block 565, the AP 170, for the multiple STAs determined to have sent uplink data indications, performs other operations, e.g., to prepare for subsequent reception of UL data from the STAs as illustrated by FIG. 2. Similarly, in block 575, the STA 110 performs other operations, e.g., to prepare for and perform subsequent transmission (e.g., in period 250) of UL data to the AP.

The AP 170 may in some embodiments transmit a polling map for the multiple STAs, receive at least one pilot from at least one of the multiple STAs in accordance with the polling map, send scheduling information and/or precoding to the at least one of the multiple STAs and attempt to process in a receiver chain data received from at least one of the multiple STAs in accordance with the scheduling information and precoding.

The STA 110 may in some embodiments receive a polling map from AP 170, send at least one pilot in accordance with the polling map, receive scheduling information and/or precoding from AP 170 and processing data in a transmission chain for transmission to AP 170 in accordance with the received scheduling information and precoding. In some embodiments, the sending/receiving of polling map and pilots may be skipped.

To show the feasibility of one of the proposed uplink indication techniques, we performed numerical simulations. Simulation environments are follows:
Channel model: Indoor channel model B;
FFT size: 256;
Subband size: 26 subcarriers;
Codebook size M: 78 (26*3 OFDM symbols);
Codebook cardinality N: $2^9$=512;
Codebook construction: M by N DFT codebook;
Decoding method: Orthogonal matching pursuit (OMP); and
Operating SNR=10 dB and 20 dB.

Figure 6:
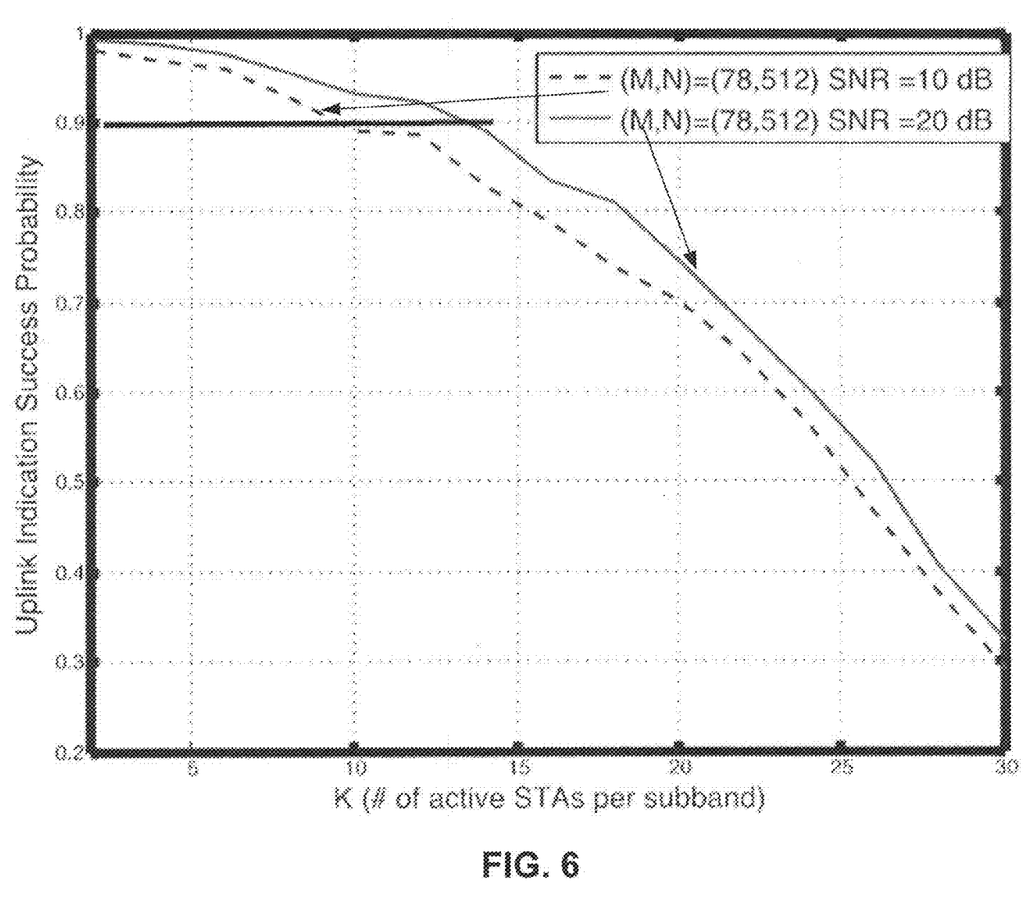
FIG. 6 is a graph illustrating successful decoding probability of an exemplary proposed uplink data indication transmission.

As shown in FIG. 6, when SNR=10 dB, 10 STAs can simultaneously send the uplink data indication codewords with the 90 percent of success decoding probability. For the case of SNR=20 dB, 14 STAs can send the uplink data indication codewords at the same time with the 90 percent of success decoding probability.

Exemplary technical effects of the various embodiments herein include some or all of the following. One proposal is a unified uplink MIMO-OFDMA transmission protocol for 802.11 ax systems. One ingredient of an exemplary proposed protocol is an efficient uplink data indication method that is flexible enough to support MIMO transmission (such as beamforming or spatial multiplexing) and traffic type (e.g., access category) of uplink data traffic. In particular, in the phase of uplink data indication, the proposed ideas can reduce the control channel overheads that are required for the uplink data indication period compared to the case of using orthogonal codes in CDMA. If we apply CDMA (i.e., orthogonal code) based transmission signals for uplink data indication period, we need $2^L$ (=4096) time-frequency resources when L=12. However, using the fact that the number of active uplink users is less than the 100 STAs in a particular instance with high probability, we can reduce the required resources by the factor of ⅜ (i.e., 3 OFDM symbols instead of using 8 OFDM symbols) while obtaining reliable active STA ID detection performance. Furthermore, the proposed STA ID association method is flexible to enable multi-stream uplink data traffic indication and resource allocation based on traffic types, which were not supported previously.

The following are examples of possible implementations.

Example 1

A method, comprising: receiving at least one uplink data indication transmission over a subband and one or more orthogonal frequency division multiplexing symbols from at least one station in a wireless local area network communication system; decoding the received at least one uplink data indication transmission to determine a unique codeword for each of the at least one station; and determining, from the determined unique codeword and using a mapping between station identification and codewords in a codebook, unique station identification for each of the at least one station.

Example 2

The method of example 1, further comprising for the at least one station determined to have sent the uplink data indication, performing other operations to prepare for subsequent reception of uplink data from the at least one station determined to have sent the uplink data indication.

Example 3

The method of any one of examples 1 to 2, wherein decoding is performed using a sparse signal recovery algorithm.

Example 4

The method of any one of examples 1 to 3, wherein determining unique station identification for each of the at least one station further comprises determining whether a determined unique codeword for a given one of the at least one station corresponds to a linear combination of codewords, and, if so, determining, based on one or more rules mapping linear combinations of codewords to traffic types, a traffic type for an uplink transmission to be subsequently performed by the given station.

Example 5

The method of any one of examples 1 to 4, wherein determining unique station identification for each of the at least one station further comprises determining if a determined unique codeword for a given one of the at least one station corresponds to a linear combination of codewords, and, if so, determining, based on one or more rules mapping linear combinations of codewords to multiple input, multiple output modes, a multiple input, multiple output mode for an uplink transmission to be subsequently performed by the given station. Example 6. The method of any one of examples 1 to 5, wherein the station identification comprises an association identifier. Example 7. The method of any one of examples 1 to 6, wherein the codewords in the codebook are not orthogonal. Example 8. The method of example 7, wherein the codebook is a non-orthogonal codebook constructed by selecting partial rows of an orthogonal matrix. Example 9. The method of example 8, wherein the orthogonal matrix is one of a discrete Fourier transform matrix or a Hadamard matrix.

Example 10

The method of any one of examples 1 to 9, wherein a subset of bits in the station identification are mapped to a corresponding subband index corresponding to a subband to be used for uplink data indication transmission from one or more of the at least one station. Example 11. The method of example 10, wherein the station identification is mapped in a manner so that stations are grouped into multiple groups and wherein multiple stations are assigned to a single group. Example 12. The method of example 10, wherein the station identification is mapped in a manner so that stations are uniformly spread over a plurality of the subbands. Example 13. The method of any one of examples 1 to 12, wherein receiving at least one uplink data indication transmission further comprises receiving uplink data indication frame transmissions on one or more primary channels and one or more secondary channels.

A further example is an apparatus that includes one or more processors and one or more memories including computer program code. The one or more memories and the computer program code are configured to, with the one or more processors, cause the apparatus to perform the methods in any one of examples 1-13. An access point can comprise the apparatus of this paragraph.

In another example of an embodiment, an apparatus comprises: means for receiving at least one uplink data indication transmission over a subband and one or more orthogonal frequency division multiplexing symbols from at least one station in a wireless local area network communication system; means for decoding the received at least one uplink data indication transmission to determine a unique codeword for each of the at least one station; and means for determining, from the determined unique codeword and using a mapping between station identification and codewords in a codebook, unique station identification for each of the at least one station. A further exemplary embodiment is an apparatus that comprises means for performing any of the methods of examples 1-13. An access point can comprise the apparatus of this paragraph.

Example 14

Another method comprises: in a station in a wireless local area network communication system, determining a unique codeword from a codebook based on a unique station identification for the station and a mapping between station identification and codewords in the codebook; and performing, using the unique codeword, at least one uplink data indication transmission over a subband and over one or more orthogonal frequency division multiplexing symbols from the station.

Example 15

The method of example 14, further comprising, after performing the at least one uplink data indication transmission, transmitting uplink data from the station in an uplink transmission. Example 16. The method of any one of examples 14 or 15, wherein determining a unique codeword further comprises: determining a multiple input, multiple output mode for an uplink transmission to be subsequently performed by the station; and based on one or more rules mapping linear combinations of codewords to multiple input, multiple output modes, determining the unique codeword as a linear combination of one or more of the codewords in the codebook.

Example 17

The method of any one of examples 14 to 16, wherein determining a unique codeword further comprises: determining a traffic type to be used for data for an uplink transmission to be subsequently performed by the station; and based on one or more rules mapping linear combinations of codewords to traffic types, determining the unique codeword as a linear combination of one or more of the codewords in the codebook.

Example 18

The method of any one of examples 14 to 17, wherein the station identification comprises an association identifier. Example 19. The method of any one of examples 14 to 18, wherein the codewords in the codebook are not orthogonal.

An additional example of an embodiment includes a computer program, comprising code for performing any of the methods of examples 1 to 19, when the computer program is run on a processor. Another exemplary embodiment is the computer program according to this paragraph, wherein the computer program is a computer program product comprising a computer-readable medium bearing computer program code embodied therein for use with a computer.

A further example is an apparatus that includes one or more processors and one or more memories including computer program code. The one or more memories and the computer program code are configured to, with the one or more processors, cause the apparatus to perform the methods in any one of examples 14-19. A station can comprise the apparatus of this paragraph.

In another example of an embodiment, an apparatus comprises: means, in a station in a wireless local area network communication system, for determining a unique codeword from a codebook based on a unique station identification for the station and a mapping between station identification and codewords in the codebook; and means for performing, using the unique codeword, at least one uplink data indication transmission over a subband and over one or more orthogonal frequency division multiplexing symbols from the station. A further exemplary embodiment is an apparatus that comprises means for performing any of the methods of examples 14-19. A station can comprise the apparatus of this paragraph.

In a further exemplary embodiment, a system comprises an access point according to the above and a station according to the above.

The various controllers/data processors, memories, programs, transceivers and antenna arrays depicted in FIG. 1 and other figures may all be considered to represent means for performing operations and functions that implement the several non-limiting aspects and embodiments of this invention.

Without in any way limiting the scope, interpretation, or application of the claims appearing below, a technical effect of one or more of the example embodiments disclosed herein is to provide efficient techniques to allow OFDMA be used in WLANs. Another technical effect of one or more of the example embodiments disclosed herein is to identify STAs that respond during an uplink data indication period. Another technical effect of one or more of the example embodiments disclosed herein is indication of one or both of a MIMO mode and/or traffic types (e.g., access categories), e.g., by certain combinations of codewords.

Embodiments of the present invention may be implemented in software, hardware, application logic or a combination of software, hardware and application logic. A computer-readable medium may comprise a computer-readable storage medium that may be any media or means that can contain or store the instructions for use by or in connection with an instruction execution system, apparatus, or device, such as a computer. A computer-readable storage medium does not encompass propagating signals.

If desired, the different functions discussed herein may be performed in a different order and/or concurrently with each other. Furthermore, if desired, one or more of the above-described functions may be optional or may be combined. Although various aspects of the invention are set out above, other aspects of the invention comprise other combinations of features from the described embodiments with the features of other described embodiments, and not solely the combinations explicitly set out above or in the claims.

It is also noted herein that while the above describes example embodiments of the invention, these descriptions should not be viewed in a limiting sense. Rather, there are several variations and modifications which may be made without departing from the scope of the various inventions described in the claims.

The following abbreviations that may be found in the specification and/or the drawing figures are defined as follows:

μsec microseconds
ACK acknowledge
AID association identifier
AP access point
BP basis pursuit
CDMA code-division multiple access
CP cyclic prefix
CSI channel state information
CQI channel quality information
DCF distributed coordination function
DFT discrete Fourier transform
EDCA enhanced distributed channel access
FFT fast Fourier transform
IEEE institute of electrical and electronics engineers
L-LTF non-HT long training field
LSB least significant bit
L-STF non-HT short training field
MAC medium access control
MIMO multiple input, multiple output
MLD maximum-likelihood decoding
MSB most significant bit
NAV network allocation vector
OFDM orthogonal frequency division multiplexing
OFDMA orthogonal frequency division multiplexing access
PP-MAC probabilistic polling-MAC
RTS request to send
SIFS short interframe space
SISO single input, single output
SNR signal to noise ratio
STA station
UL uplink (i.e., from STA to AP)
WLAN wireless local area network
ZC Zadoff-Chu

What is claimed is:
1. A method, comprising:
in a station in a wireless local area network communication system, determining a unique codeword from a codebook based on a unique station identification for the station and a mapping between station identification and codewords in the codebook wherein the codewords in the codebook are not orthogonal and the codebook is constructed by selecting partial rows of an orthogonal matrix;

performing, using the unique codeword, at least one uplink data indication transmission over a subband and over one or more orthogonal frequency division multiplexing symbols from the station; and transmitting, after performing the at least one uplink data indication transmission, uplink data from the station in an uplink transmission.

2. The method of claim 1, wherein determining a unique codeword further comprises:

determining a traffic type to be used for data for an uplink transmission to be subsequently performed by the station; and based on one or more rules mapping linear combinations of codewords to traffic types, determining the unique codeword as a linear combination of one or more of the codewords in the codebook.

3. The method of claim 1, wherein the station identification comprises an association identifier.

4. An apparatus, comprising:

one or more processors; and one or more memories including computer program code, the one or more memories and the computer program code configured, with the one or more processors, to cause the apparatus to perform at least the following:

receiving at least one uplink data indication transmission over a subband and over one or more orthogonal frequency division multiplexing symbols from at least one station in a wireless local area network communication system;

decoding the received at least one uplink data indication transmission to determine a unique codeword for each of the at least one stations;

determining, from the determined unique codewords and using a mapping between station identification and codewords in a codebook, a unique station identification for each of the at least one stations, wherein the codewords in the codebook are not orthogonal and the codebook is constructed by selecting partial rows of an orthogonal matrix; and performing, for the at least one station determined to have sent the uplink data indication, other operations to prepare for subsequent reception of uplink data from the at least one station determined to have sent the uplink data indication.

5. The apparatus of claim 4, wherein decoding is performed using a sparse signal recovery algorithm.

6. The apparatus of claim 4, wherein determining a unique station identification for each of the at least one stations further comprises determining whether a determined unique codeword for a given one of the at least one stations corresponds to a linear combination of codewords, and, if so, determining, based on one or more rules mapping linear combinations of codewords to traffic types, a traffic type for an uplink transmission to be subsequently performed by the given station.

7. The apparatus of claim 4, wherein determining a unique station identification for each of the at least one stations further comprises determining if a determined unique codeword for a given one of the at least one station corresponds to a linear combination of codewords, and, if so, determining, based on one or more rules mapping linear combinations of codewords to multiple input, multiple output modes, a multiple input, multiple output mode for an uplink transmission to be subsequently performed by the given station.

8. The apparatus of claim 4, wherein a subset of bits in the station identification are mapped to a corresponding subband index corresponding to a subband to be used for uplink data indication transmission from one or more of the at least one at least one stations.

9. The apparatus of claim 8, wherein the station identification is mapped in a manner so that stations are uniformly spread over a plurality of the subbands.

10. The apparatus of claim 4, wherein receiving at least one uplink data indication transmission further comprises receiving uplink data indication frame transmissions on one or more primary channels and one or more secondary channels.

11. An apparatus, comprising:

one or more processors; and one or more memories including computer program code, the one or more memories and the computer program code configured, with the one or more processors, to cause the apparatus to perform at least the following:

in a station in a wireless local area network communication system, determining a unique codeword from a codebook based on a unique station identification for the station and a mapping between station identification and codewords in the codebook, wherein the codewords in the codebook are not orthogonal and the codebook is constructed by selecting partial rows of an orthogonal matrix;

performing, using the unique codeword, at least one uplink data indication transmission over a subband and over one or more orthogonal frequency division multiplexing symbols from the station; and transmitting, after performing the at least one uplink data indication transmission, uplink data from the station in an uplink transmission.

12. The apparatus of claim 11, wherein determining a unique codeword further comprises:

determining a multiple input, multiple output mode for an uplink transmission to be subsequently performed by the station; and based on one or more rules mapping linear combinations of codewords to multiple input, multiple output modes, determining the unique codeword as a linear combination of one or more of the codewords in the codebook.

13. The apparatus of claim 11, wherein determining a unique codeword further comprises:

determining a traffic type to be used for data for an uplink transmission to be subsequently performed by the station; and based on one or more rules mapping linear combinations of codewords to traffic types, determining the unique codeword as a linear combination of one or more of the codewords in the codebook.

14. The apparatus of claim 11, wherein the station identification comprises an association identifier.

15. The apparatus of claim 11, wherein the orthogonal matrix is one of a discrete Fourier transform matrix or a Hadamard matrix.

16. The apparatus of claim 11, wherein a subset of bits in the station identification are mapped to a corresponding subband index corresponding to a subband to be used for the uplink data indication transmission.

17. The apparatus of claim 11, wherein transmitting at least one uplink data indication transmission further comprises transmitting uplink data indication frame transmissions on one or more primary channels and one or more secondary channels.

* * * * *